US009939056B2

(12) United States Patent
Jensen et al.

(10) Patent No.: US 9,939,056 B2
(45) Date of Patent: Apr. 10, 2018

(54) FINAL DRIVE SYSTEM FOR A MACHINE

(71) Applicant: Caterpillar Inc., Peoria, IL (US)

(72) Inventors: Jeffrey Edward Jensen, Dunlap, IL (US); Jacob Carl Wyss, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 192 days.

(21) Appl. No.: 14/887,391

(22) Filed: Oct. 20, 2015

(65) Prior Publication Data
US 2017/0108099 A1  Apr. 20, 2017

(51) Int. Cl.
| | | |
|---|---|---|
| *B60K 17/04* | (2006.01) | |
| *F16H 37/08* | (2006.01) | |
| *B60K 17/16* | (2006.01) | |
| *F16D 55/24* | (2006.01) | |
| *F16H 1/28* | (2006.01) | |
| *F16H 57/08* | (2006.01) | |
| *F16H 57/00* | (2012.01) | |

(52) U.S. Cl.
CPC ......... *F16H 37/082* (2013.01); *B60K 17/046* (2013.01); *B60K 17/16* (2013.01); *F16D 55/24* (2013.01); *F16H 1/28* (2013.01); *F16H 57/0025* (2013.01); *F16H 57/08* (2013.01)

(58) Field of Classification Search
CPC .................................................. B60K 17/046
See application file for complete search history.

(56) References Cited

U.S. PATENT DOCUMENTS

| | | | |
|---|---|---|---|
| 3,754,625 A | 8/1973 | Voth et al. | |
| 4,037,694 A * | 7/1977 | Keese | B60T 1/062 180/370 |
| 4,142,615 A * | 3/1979 | Sidles, Jr. | B60K 17/046 180/370 |
| 4,213,514 A | 7/1980 | Ehrlinger et al. | |
| 4,275,616 A | 6/1981 | Ehrlinger et al. | |
| 4,540,073 A * | 9/1985 | Rogier | B60K 17/046 188/71.5 |
| 4,646,880 A | 3/1987 | Logan | |
| 5,088,967 A * | 2/1992 | Opitz | B60K 17/046 180/10 |
| RE41,285 E | 4/2010 | Kingston | |

(Continued)

FOREIGN PATENT DOCUMENTS

| | | |
|---|---|---|
| EP | 1053147 | 11/2001 |
| WO | 1998046444 | 10/1998 |

*Primary Examiner* — Tisha D Lewis (57) ABSTRACT

A final drive system for a machine includes a stationary side housing in which a planetary gear assembly and an elongated brake hub member are disposed. The planetary gear assembly includes a ring gear disposed within the stationary side housing; a planetary gear carrier rotatably supported by the stationary side housing; and multiple planet gears that are disposed in mesh with the ring gear. The planetary gear assembly further includes a sun gear disposed in mesh with the planet gears to rotatably drive the planet gears. The elongated brake hub member axially extends from the sun gear and defines a set of internal and external splines that are located distally away from the integrally formed sun gear. The set of internal splines and the set of external splines are configured to mesh with a set of external splines from an axle shaft and a brake pack of the machine respectively.

20 Claims, 5 Drawing Sheets

(56) References Cited

U.S. PATENT DOCUMENTS

| | | | |
|---|---|---|---|
| 8,313,410 B2* | 11/2012 | Varela | F16H 1/28 |
| | | | 180/369 |
| 2012/0196715 A1* | 8/2012 | Turner | B60K 17/046 |
| | | | 475/159 |

* cited by examiner

FINAL DRIVE SYSTEM FOR A MACHINE

TECHNICAL FIELD

The present disclosure relates to a drive system for a machine. More particularly, the present disclosure relates to a final drive system for selectively driving a ground engaging member of a machine.

BACKGROUND

Earth moving machines have long been known to employ final drive systems for selectively driving one or more ground engaging members present on the machine. These final drive systems typically include components that facilitate rotation of the ground engaging members and application of braking force on the ground engaging members. In some cases, these final drive systems may include several components in which each component may be configured to accomplish a unique function such as, but not limited to, the rotation of the ground engaging members, the application of braking force on the ground engaging members, and the like. In other cases, the final drive systems may require longer and/or large-diameter axle shafts to transmit the driving power from a differential assembly to the ground engaging members of the machine. Such configurations of components may entail a larger space claim by the components. Moreover, such components may be cumbersome and/or expensive to manufacture due to their bulky geometry and/or other design parameters besides a large number of components involved in forming the final drive system.

U.S. Pat. No. 4,213,514 (hereinafter referred to as "the '514 patent") discloses a wheel drive for a piece of construction equipment or the like. The wheel drive of the '514 patent has a hydraulic motor mounted in a wheel support on which is a rotatable wheel-carrying hub. The output shaft of the motor is connected to one member of a clutch whose other member is connected to a two-stage planetary-gear transmission whose output gear is a ring gear integrally formed in the wheel hub. The clutch is hydraulically actuatable through a passage extending axially through the motor shaft.

However, components of the '514 patent may not be compactly-sized and/or configured components. Moreover, the '514 patent does not disclose any components for facilitating transmission of a braking force to the wheel hub. Hence, there is a need for a system that is simple in construction while also being able to facilitate a transmission of driving power, and a transmission of braking force to the wheel hub of the machine.

SUMMARY OF THE DISCLOSURE

In an aspect of the present disclosure, a final drive system for a machine includes a stationary side housing in which a planetary gear assembly and an elongated brake hub member are disposed. The planetary gear assembly includes a ring gear, a planetary gear carrier, multiple planet gears, and a sun gear. The ring gear is disposed on an inner surface of the stationary side housing. The planetary gear carrier is disposed at least in part within the stationary side housing and is rotatably supported by the stationary side housing. Each of the planet gears is rotatably coupled to the planetary gear carrier and disposed in mesh with the ring gear. The planet gears are configured to rotate in unison with the planetary gear carrier. The sun gear is disposed in mesh with the planet gears so as to rotatably drive the plurality of planet gears.

The brake hub member axially extends from the sun gear so as to be disposed integrally with the sun gear. The elongated brake hub member defines a set of internal splines and a set of external splines located distally away from the integrally formed sun gear, the set of internal splines and the set of external splines being disposed concentrically to one another. The set of internal splines are configured to mesh with a set of external splines from an axle shaft while the set of external splines are configured to mesh with a brake pack of the machine.

In another aspect of the present disclosure, an axle assembly for a machine includes an axle housing defining at least a pair of side openings disposed in opposing relation to one another; a differential assembly disposed within the axle housing, the differential assembly including a pair of axle shafts laterally extending from the pair of side openings defined in the axle housing; and a pair of stationary side housings located adjacent to the pair of side openings and releasably coupled to the axle housing. The axle assembly further includes a pair of final drive systems consistent with embodiments of the present disclosure, wherein one final drive assembly is associated with a given axle shaft of the differential assembly.

In yet another aspect of the present disclosure, embodiments disclosed herein have also been directed to a machine having a prime mover, and drive shaft rotatably coupled to the prime mover. The machine employs an axle assembly, consistent with embodiments of the present disclosure to transmit power from the drive shaft to a pair of ground engaging members present on the machine.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
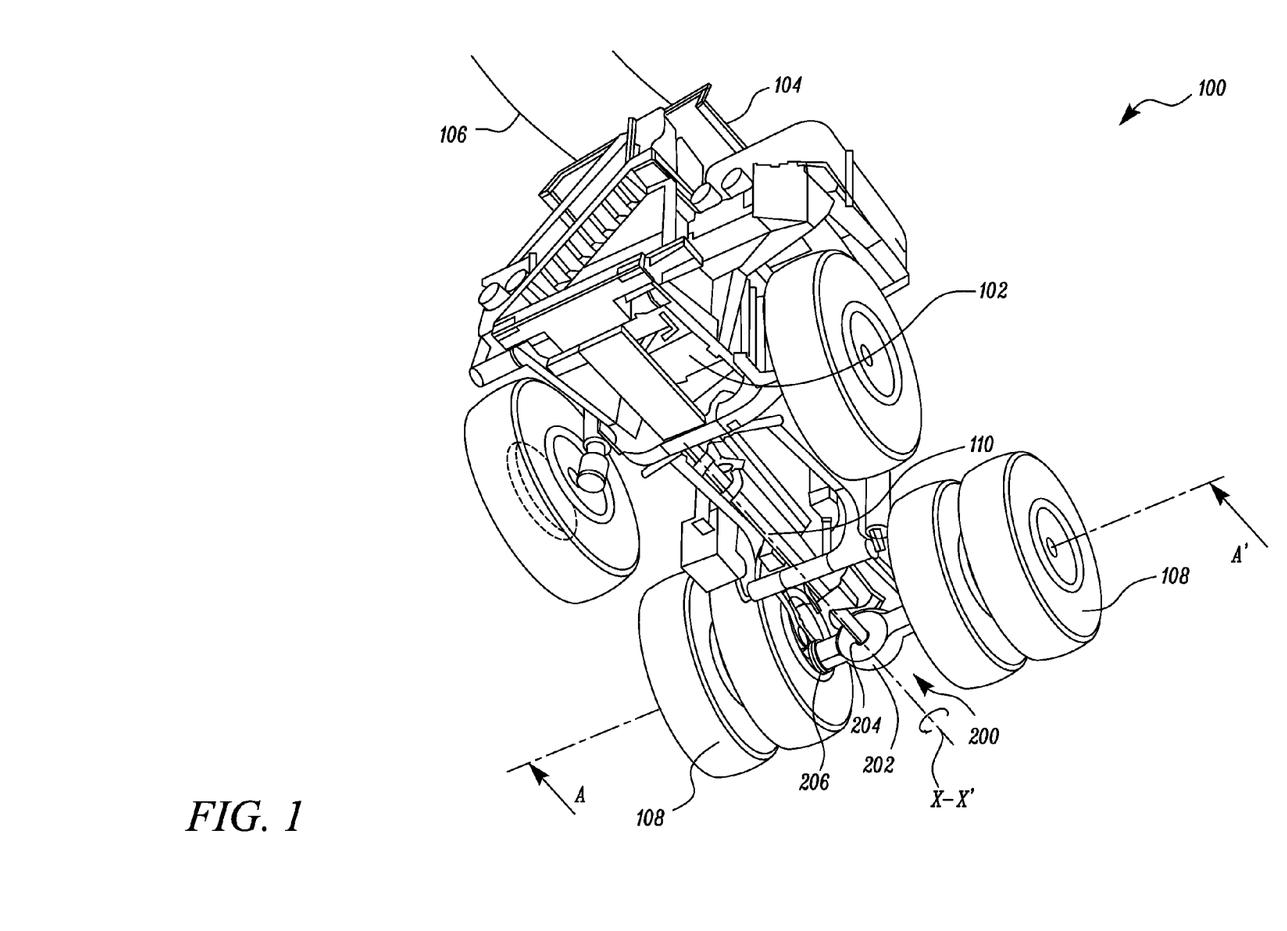
FIG. 1 is a side view of an exemplary machine, in which embodiments of the present disclosure can be implemented.

FIG. 1 illustrates an exemplary machine 100 that is embodied in the form of a wheeled vehicle, for e.g., a mining truck (as shown). The machine 100 may be used in a variety of applications including mining, quarrying, road construction, construction site preparation, etc. For example, the mining truck of the present disclosure may be employed for hauling earth materials such as soil, debris, or other naturally occurring deposits from a worksite. Although a mining truck is depicted in FIG. 1, other types of mobile machines such as, but not limited to, large wheel loaders, off-highway trucks, articulated trucks, on-highway trucks, or the like may be employed in lieu of the mining truck.

Referring to FIG. 1, the machine 100 includes a prime mover 102 for e.g., an engine. The engine disclosed herein can power the machine 100 by combustion of natural resources, such as gasoline, liquid natural gas, or other petroleum products. As such, the engine can be embodied as a petrol engine, a diesel engine, a dual-fuel engine or any other kind of engine utilizing combustion of fuel for generation of power.

It may be noted that although the prime mover 102 is disclosed as an engine, an electric motor could be used in lieu of the engine. Moreover, the electric motor may be a stand-alone electric motor, or an electric motor that can be used in conjunction with the engine. Therefore, the electric motor may be embodied in the form of any system that uses electric power for propulsion.

Further, the electric motor may, additionally or optionally, be powered with the help of a pantograph 104 and an overhead catenary 106 (shown in FIG. 1) that is provided for supplying current to the electric motor. Furthermore, as shown in the illustrated embodiment of FIG. 1, the machine 100 may also include an Electronic Control module (ECM) (not shown) that is configured to regulate an amount of power supplied from the overhead catenary 106 to the electric motor.

The machine 100 further includes multiple ground engaging members for e.g., wheels 108 that are selectively coupled to the prime mover 102 using various components explanation to which will be made later herein. The ground engaging members are configured to receive driving power from the prime mover 102. Although wheels have been disclosed herein, other suitable types of ground engaging members known in the art can be used in lieu of the wheels. As such, in alternative embodiments of the present disclosure, the machine 100 can optionally be embodied in the form of a tracked vehicle i.e., a vehicle employing tracks or crawlers.

Further, the machine 100 may be a manually-operated machine 100, an autonomous machine 100, or a machine 100 that is operable in both manual and autonomous mode. Therefore, notwithstanding any particular type or configuration of machine 100 disclosed in this document, it will be appreciated by one skilled in the art that systems disclosed herein can be similarly applied to other types of machines known in the art without deviating from the spirit of the present disclosure.

Figure 2:
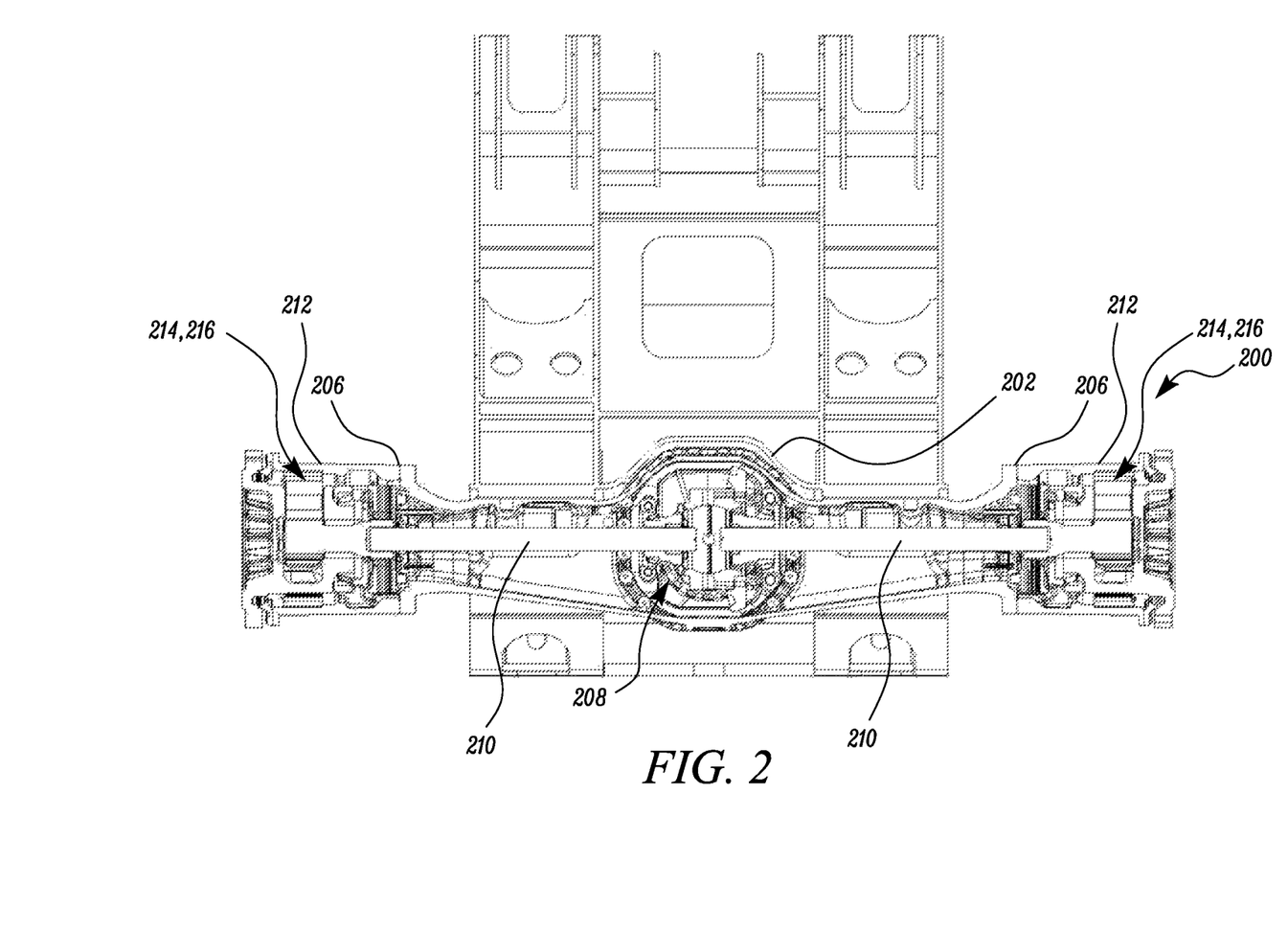
FIG. 2 is a diagrammatic illustration of an axle assembly that can be employed by the exemplary machine of FIG. 1 in accordance with embodiments of the present disclosure.

As shown in FIG. 1, the machine 100 further includes a drive shaft 110 that is rotatably coupled to the prime mover 102 for receiving driving power from the prime mover 102. FIG. 2 provides a diagrammatic illustration of the axle assembly 200 in accordance with embodiments of the present disclosure. As the axle assembly 200 is typically located between the rear wheels 108 of the machine 100, the axle assembly 200 illustrated in FIG. 2 is sectioned in a plane A-A' disposed parallel to the set of rear wheels 108 (See FIG. 1) to reveal components located inside the axle assembly 200. Still referring to FIG. 1, the axle assembly 200 includes an axle housing 202 defining a central opening 204 that is configured to receive the drive shaft 110 therethrough. In an embodiment of this disclosure, the central opening 204 of the axle housing 202 may be alternatively configured or designed to receive a pinion gear (not shown) that is typically associated with the drive shaft 110 in any manner known to persons skilled in the art. Moreover, as shown in FIG. 2, the axle housing 202 is also configured to define a pair of side openings 206 that are disposed in opposing relation to one another.

The axle assembly 200 further includes a differential assembly 208 disposed within the axle housing 202 and rotatably coupled to the drive shaft 110. The differential assembly 208 includes a pair of axle shafts 210 laterally extending from the pair of side openings 206 defined in the axle housing 202. A type and/or configuration of gearing that forms part of the differential assembly 208 located between the drive shaft 110 and the pair of axle shafts 210 is merely exemplary in nature and hence, non-limiting of this disclosure. Any type of gearing arrangement may be used to form part of the differential assembly 208 disclosed herein. Therefore, it may be noted that the scope of the differential assembly 208 is not limited to the exact type and/or configuration of the gearing shown between the drive shaft 110 and the pair of axle shafts 210 from FIG. 2, rather the scope of the differential assembly 208 can extend to include any known type and/or configuration of gearing arrangement between the drive shaft 110 and the pair of axle shafts 210 without deviating from the spirit of this disclosure.

The axle assembly 200 further includes a pair of stationary side housings 212 located adjacent to the pair of side openings 206. Each of the stationary side housings 212 is releasably coupled to the axle housing 202 using fasteners (not shown). The axle assembly 200 further includes a final drive system 214 having a planetary gear assembly 216, explanation to which will be rendered hereinafter in conjunction with FIGS. 3 and 4.

Figure 3:
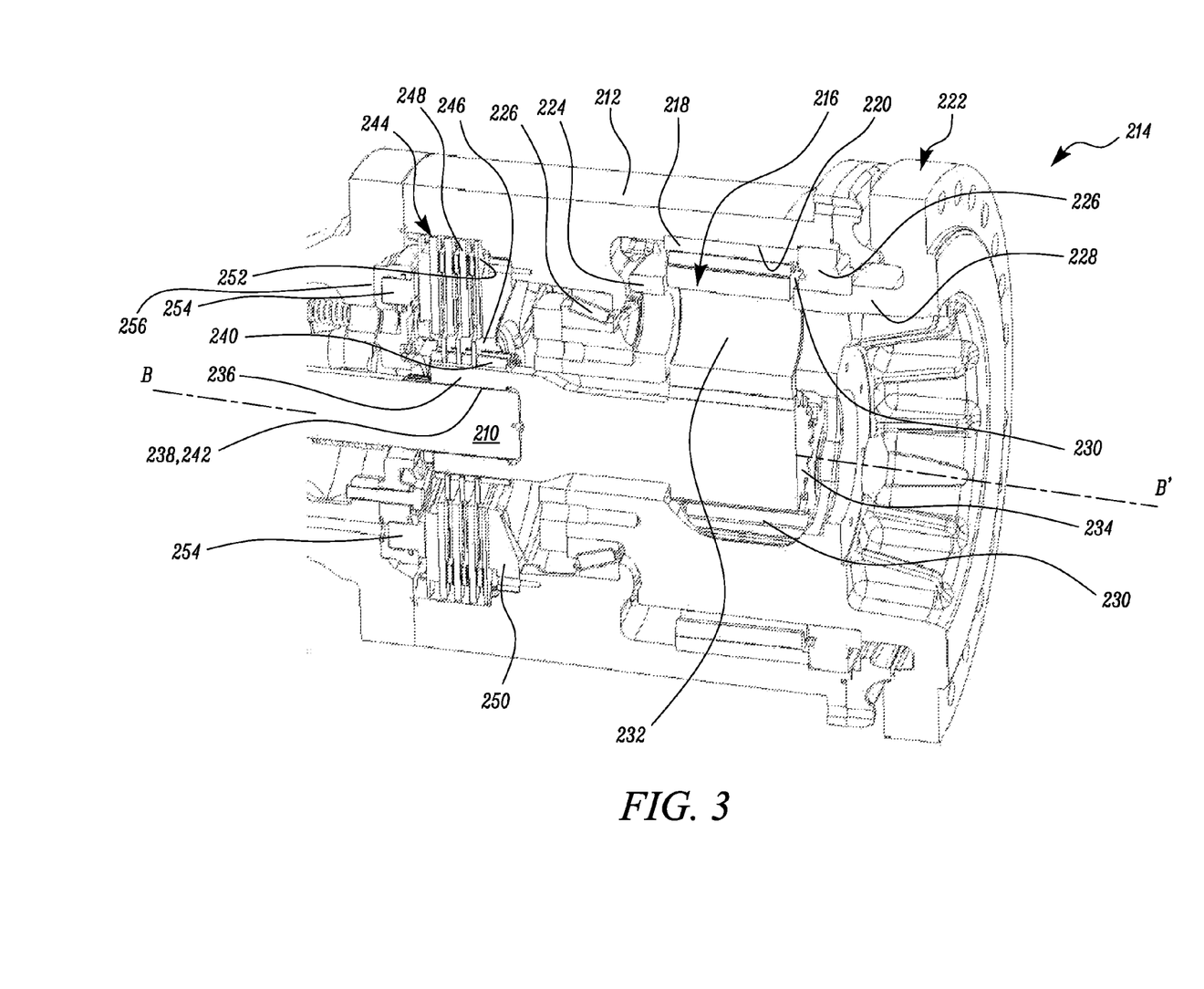
FIG. 3 is a sectional view of a final drive system employed by the axle assembly of FIG. 2, in accordance with an embodiment of the present disclosure.

The planetary gear assembly 216 is disposed within the stationary side housing 212 and includes a ring gear 218 that is rigidly disposed on an inner surface 220 of the stationary side housing 212. The planetary gear assembly 216 includes a planetary gear carrier 222 disposed at least in part within the stationary side housing 212 and rotatably supported by the stationary side housing 212. As shown in FIG. 3, the planetary gear carrier 222 includes a first portion 224 that is rotatably supported within the stationary side housing 212 using a pair of bearing members 226 that are configured to facilitate rotation of the planetary gear carrier 222 relative to the stationary side housing 212. The bearing members 226 disclosed herein may be for e.g., roller bearings. It may be noted that although roller bearings are disclosed herein, other types of bearing members could be used in lieu of the roller bearings for e.g., thrust bearings, ball bearings, journal bearings and the like. The planetary gear carrier 222 further includes a second portion 228 that extends axially from the first portion 224. The second portion 228 of the planetary gear carrier 222 is configured to releasably couple with a wheel rim (not shown) of the machine 100 using fasteners (not shown).

Figure 4:
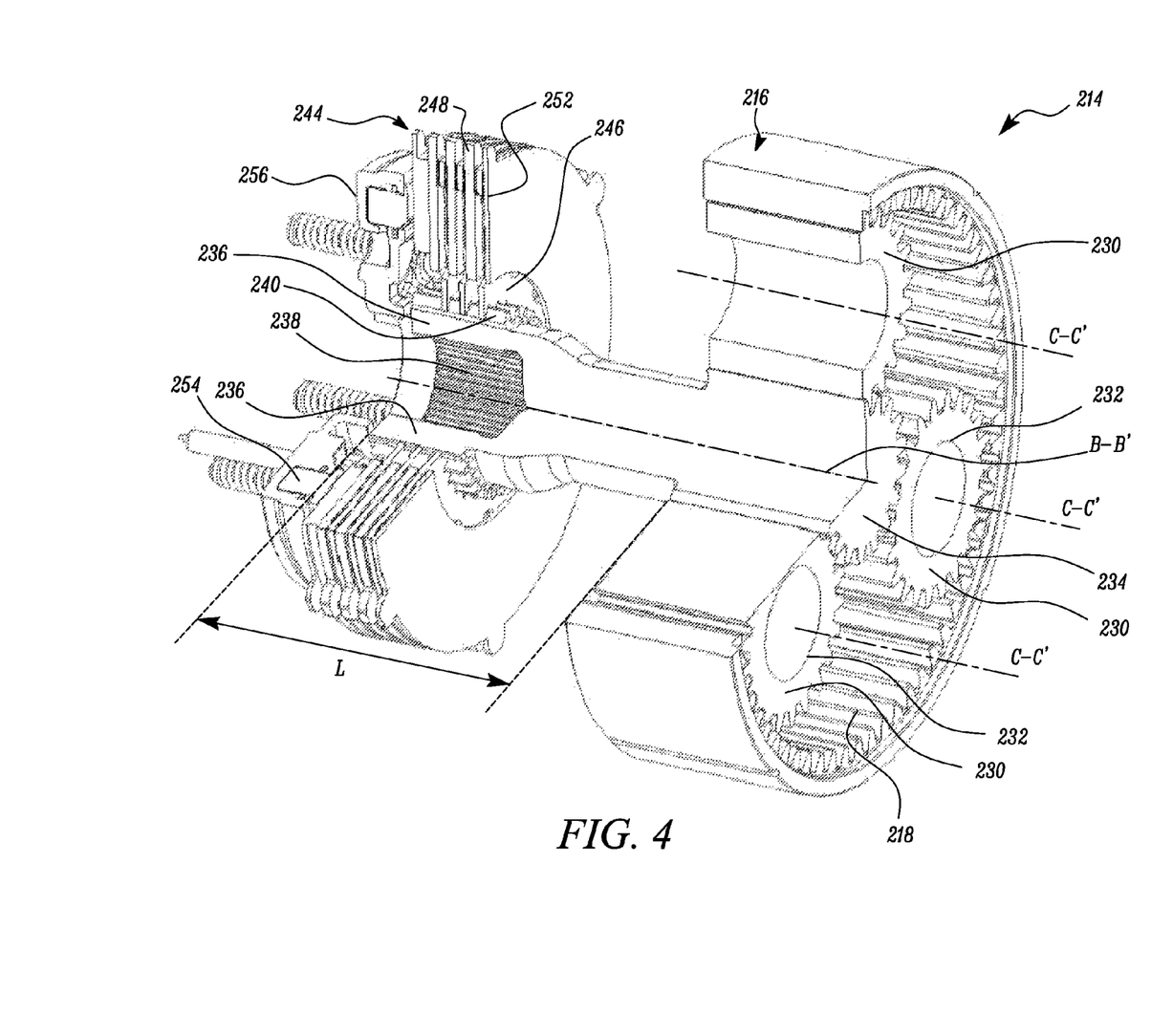
FIG. 4 is a partially assembled view of the final drive system from FIG. 3 showing a planetary gear system and a brake hub member therein.

Referring to FIGS. 3 and 4, the planetary gear assembly 216 further includes multiple planet gears 230 that are rotatably coupled to the planetary gear carrier 222 and disposed in mesh with the stationary ring gear 218. Each of the planet gears 230 is rotatably secured to the planetary gear carrier 222 using for e.g., a roller pin 232 or other mechanical elements typically known to one skilled in the art. The planet gears 230 are hence, configured to rotate the planetary gear carrier 222 about axis B-B'. The planetary gear assembly 216 further includes a sun gear 234 that is disposed in mesh with each of the planet gears 230. The sun gear 234 is configured to rotatably drive and hence, cause each of the planet gears 230 to rotate about their respective axes C-C'.

In an embodiment as shown in FIGS. 3 and 4, the ring gear 218, the planet gears 230, and the sun gear 234 may include spur gear teeth thereon. In another embodiment, the ring gear 218, the planet gears 230, and the sun gear 234 may include helically-cut gear teeth. It may be noted that a type of gear teeth used on the each of the gears 218, 230, and 234 depends on specific requirements of a power transmission application. Therefore, it will be appreciated that with use of embodiments disclosed herein, a type of gear teeth used on the planet gears 230, the ring gear 218, and the sun gear 234 can be beneficially configured to suit specific requirements of an application.

Figure 5:
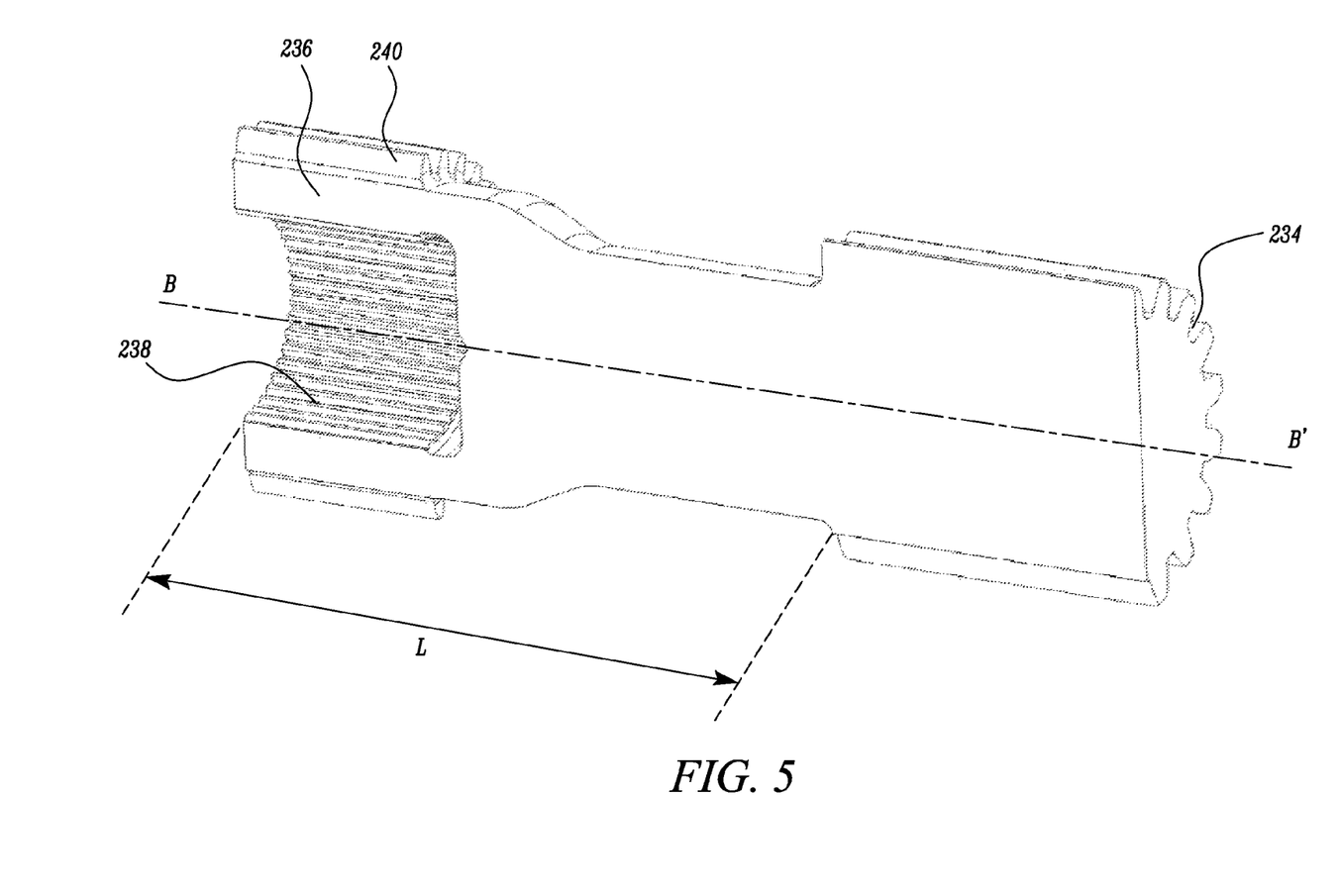
FIG. 5 is a sectional view of a sun gear with the integrated brake hub member from the planetary gear system of FIG. 4.

With reference to FIGS. 3, 4, and 5, the final drive system 214 further includes an elongated brake hub member 236 axially extending from the sun gear 234 so as to be disposed integrally with the sun gear 234. The brake hub member 236 defines a set of internal splines 238 and a set of external splines 240 located distally away from the integrally formed sun gear 234. Moreover, the set of internal splines 238 and the set of external splines 240 extend partway along a length L of the elongated brake hub member 236 (refer to FIG. 5). The set of internal splines 238 are configured to mesh with a set of external splines 242 from the respective axle shaft 210. The set of external splines 240 on the brake hub member 236 are configured to mesh with a brake pack 244 of the machine 100.

In the illustrated embodiment of FIGS. 3, 4, and 5, the set of internal splines 238 and the set of external splines 240 are being disposed concentrically to one another. However, in other embodiments, the set of internal splines 238 and the set of external splines 240 may be disposed in a non-concentric manner i.e., offset from one another without deviating from the scope of this disclosure.

The brake pack 244 disclosed herein includes at least one rotatable friction plate 246 and at least one stationary reaction plate 248. Three friction plates 246 and three reaction plates 248 are shown in the illustrated embodiment of FIGS. 3-4. However, in other embodiments, fewer or more number of friction plates and reaction plates could be used depending on specific requirements of an application. Moreover, as shown in FIGS. 3-4, the friction plates 246 and the reaction plates 248 are co-located in an alternating manner about the set of external splines 238 of the brake hub member 236.

The axle assembly 200 further includes an annular brake pad 250 that is disposed about the brake hub member 236 and located at one end 252 of the brake pack 244. The annular brake pad 250 is being rigidly coupled to the stationary side housing 212 and is hence, configured to remain stationary together with the stationary side housing 212. Moreover, the axle assembly 200 also includes a brake piston 254 that is disposed in the stationary side housing 212 and located at another end 256 of the brake pack 244. The brake piston 254 is operable for selectively applying a braking force on the brake pack 244 so as to prevent rotation of the brake hub member 236 relative to the stationary side housing 212.

Although some components pertaining to the axle assembly 200 and/or the final drive system 214 have been omitted from FIG. 4, it is to be noted that the axle assembly 200 and/or the final drive system 214 could, additionally or optionally, include other components than those illustrated in the view of FIG. 4. For example, as disclosed earlier herein, the final drive system 214 of the present disclosure includes bearing members 226 (shown in FIG. 3) that are configured to facilitate rotation of the planetary gear carrier 222 relative to the stationary side housing 212. Therefore, components omitted in the illustration of FIG. 4 should not be construed, in any manner, as being limiting of the present disclosure. Rather, such omission of components in the illustration of FIG. 4 have been willfully made to improve clarity and aid a reader's understanding of the present disclosure.

A manner of working and operation of the machine 100 will be described hereinafter. A reader of this disclosure is advised to refer to the accompanying drawings i.e., FIGS. 1 to 5 for a better understanding of the embodiments disclosed herein. However, it should be noted that the manner of working and operation disclosed herein should not be construed, in any way, as being limiting of this disclosure as such explanation has been rendered to merely aid a reader's understanding of the present disclosure.

During operation of the machine 100, the prime mover 102 produces driving power for e.g., by combustion of fuel, by conversion of electrical energy into mechanical power, or both. This driving power may be transmitted into the drive shaft 110 to rotate the drive shaft 110 about an axis X-X' (See FIG. 1). The drive shaft 110 in turn causes the gearing elements present in the differential assembly 208 to co-operatively rotate in mesh. The gearing elements associated with the pair of axle shafts 210 thus rotate to impart torque into the respective axle shafts 210. The set of external splines 242 present on each of the axle shafts 210 can in turn rotate the respective brake hub member 236 and the integrated sun gear 234 vis-à-vis the set of internal splines 238 located on the respective brake hub member 236.

The sun gear 234, disposed in mesh with the planet gears 230, in turn rotates each of the planet gears 230 about their respective axes C-C'. Rotation of the planet gears 230 on the stationary ring gear 218 can cause each of the planet gears 230 to revolve about the sun gear 234 thus causing the planetary gear carrier 222 to rotate about axis B-B'. Rotation of the planetary gear carrier 222 can subsequently impart rotation to the wheel 108 of the machine 100 and can cause the machine 100 to be propelled in a forward or reverse direction.

When application of braking force is required for e.g., to slow down a wheel speed of the machine 100 or to bring the machine 100 to a halt, the brake piston 254 is actuated fluidly i.e., hydraulically, pneumatically, or a combination thereof. Using a fluid passage located adjacent to the brake piston 254, pressurized fluid is routed to bias the brake piston 254 towards the brake pack 244 and the stationary brake pad 250 (See FIG. 3). As the brake piston 254 is biased towards the brake pack 244, the brake pack 244 is compressed against the stationary brake pad 250. A braking force, resistive to the driving power, is transmitted from the stationary brake pad 250 to the brake pack 244 and such braking force is communicated vis-à-vis the set of internal splines on the brake pack 244 and the set of external splines 240 on the brake hub member 236 to resist the rotation of the brake hub member 236 and the axle shaft 210 relative to the stationary side housing 212.

Various embodiments disclosed herein are to be taken in the illustrative and explanatory sense, and should in no way be construed as limiting of the present disclosure. All joinder references (e.g., attached, affixed, coupled, engaged, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Embodiments of the present disclosure have applicability for use and implementation in producing compact and cost-effective final drive systems. Moreover, embodiments of the present disclosure also have applicability in reducing an overall number of components while also increasing a power density of the components used in the final drive system.

With regards to the final drive system 214 of the present disclosure, as the driving power can be transmitted from the set of external splines 242 on the axle shaft 210 vis-à-vis the set internal splines 238 on the brake hub member 236, a length of the axle shaft 210 can be beneficially reduced to increase a stiffness of the axle shaft 210 and also a torque transmission capacity of the axle shaft 210. Moreover, although the set of external splines 240 are located on the brake hub member 236 that is integrally formed with the sun gear 234, the type of gear teeth formed on the sun gear 234, the ring gear 218, and each of the planet gears 230 can be chosen regardless of the integration to suit specific requirements of a power transmission application.

Use of embodiments disclosed herein can thus help manufacturers of final drive systems to do away with longer and/or large-diameter axle shafts for transmitting the driving power from the differential assembly to the ground engaging members of the machine. Moreover, the configuration of components disclosed herein can reduce an overall space claim by the components. Further, as such components may be manufactured using conventionally known processes for e.g., turning, milling, gear-hobbing, and the like; use of embodiments disclosed herein can beneficially help manufacturers in mitigating costs, time, and effort previously associated with manufacture of conventional final drive systems.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A final drive system for a machine, the final drive system comprising:
   a stationary side housing;
      a planetary gear assembly disposed within the stationary side housing, the planetary gear assembly comprising:
      a ring gear disposed on an inner surface of the stationary side housing;
      a planetary gear carrier disposed at least in part within the stationary side housing and rotatably supported by the stationary side housing;
      a plurality of planet gears rotatably coupled to the planetary gear carrier and disposed in mesh with the ring gear, the plurality of planet gears configured to rotate in unison with the planetary gear carrier; and
      a sun gear disposed in mesh with the plurality of planet gears, the sun gear configured to rotatably drive the plurality of planet gears; and
      a elongated brake hub member axially extending from the sun gear so as to be disposed integrally with the sun gear, the elongated brake hub member defining a set of internal splines and a set of external splines, the external splines extend partway along the length of the elongated brake hub member and located distally away from the integrally formed sun gear, wherein the set of internal splines are configured to mesh with a set of external splines from an axle shaft, and wherein the set of external splines are configured to mesh with a brake pack of the machine.

2. The final drive system of claim 1, wherein the ring gear, the plurality of planet gears, and the sun gear include one of: spur gear teeth, and helically-cut gear teeth.

3. The final drive system of claim 1, wherein the set of internal splines extend partway along a length of the elongated brake hub member.

4. The final drive system of claim 1, wherein the planetary gear carrier comprises:
   a first portion rotatably supported within the stationary side housing; and
   a second portion extending outwardly from the first portion, the second portion configured to releasably couple with a wheel rim of the machine.

5. The final drive system of claim 4 further comprising at least one bearing member disposed between the stationary side housing and the first portion of the planetary gear carrier, wherein the bearing member is configured to allow rotation of the planetary gear carrier relative to the stationary side housing.

6. An axle assembly for a machine, the axle assembly comprising:
   an axle housing defining at least a pair of side openings disposed in opposing relation to one another;
   a differential assembly disposed within the axle housing, the differential assembly comprising a pair of axle shafts laterally extending from the pair of side openings defined in the axle housing;
   a pair of stationary side housings located adjacent to the pair of side openings and releasably coupled to the axle housing; and
   a final drive system comprising:

a planetary gear assembly disposed within each stationary side housing, the planetary gear assembly comprising:
  a ring gear disposed on an inner surface of the stationary side housing;
  a planetary gear carrier disposed at least in part within the stationary side housing and rotatably supported by the stationary side housing;
  a plurality of planet gears rotatably coupled to the planetary gear carrier and disposed in mesh with the ring gear, the plurality of planet gears configured to rotate in unison with the planetary gear carrier; and
  a sun gear disposed in mesh with the plurality of planet gears, the sun gear configured to rotatably drive the plurality of planet gears; and
  an elongated brake hub member axially extending from the sun gear so as to be disposed integrally with the sun gear, the brake hub member defining a set of internal splines and a set of external splines, the external splines extend partway along the length of the elongated brake hub member and located distally away from the integrally formed sun gear, wherein the set of internal splines are configured to mesh with a set of external splines from one of the axle shafts, and wherein the set of external splines are configured to mesh with a brake pack of the machine.

7. The axle assembly of claim 6, wherein the ring gear, the plurality of planet gears, and the sun gear include one of: spur gear teeth, and helically-cut gear teeth.

8. The axle assembly of claim 6, wherein the set of internal splines extend partway along a length of the elongated brake hub member.

9. The axle assembly of claim 6, wherein the planetary gear carrier comprises:
  a first portion rotatably supported within the stationary side housing; and
  a second portion extending outwardly from the first portion, the second portion configured to releasably couple with a wheel rim of the machine.

10. The axle assembly of claim 9 further comprising at least one bearing member disposed between the stationary side housing and the first portion of the planetary gear carrier, wherein the bearing member is configured to allow rotation of the planetary gear carrier relative to the stationary side housing.

11. The axle assembly of claim 6, wherein the brake pack includes at least one rotatable friction plate and at least one stationary reaction plate, the friction plates and the reaction plates being co-located in an alternating manner about the external splines of the brake hub member.

12. The axle assembly of claim 11 further including an annular brake pad disposed about the brake hub member and located at one end of the brake pack, the brake pad rigidly coupled to the stationary side housing.

13. The axle assembly of claim 12 further including a brake piston disposed in the stationary side housing and located at another end of the brake pack, the brake piston operable for selectively applying a braking force by the brake pack on the brake hub member.

14. A machine comprising:
  a prime mover;
  a drive shaft rotatably coupled to the prime mover;
    an axle assembly for a machine, the axle assembly comprising:
    an axle housing defining:
    a central opening configured to receive the drive shaft therethrough; and
    at least a pair of side openings disposed in opposing relation to one another;
    a differential assembly disposed within the axle housing and rotatably coupled to the drive shaft, the differential assembly comprising a pair of axle shafts laterally extending from the pair of side openings defined in the axle housing;
    a pair of stationary side housings located adjacent to the pair of side openings and releasably coupled to the axle housing; and
    a final drive system comprising:
      a planetary gear assembly disposed within each stationary side housing, the planetary gear assembly comprising:
        a ring gear disposed on an inner surface of the stationary side housing;
        a planetary gear carrier disposed at least in part within the stationary side housing and rotatably supported by the stationary side housing;
        a plurality of planet gears rotatably coupled to the planetary gear carrier and disposed in mesh with the ring gear, the plurality of planet gears configured to rotate in unison with the planetary gear carrier; and
        a sun gear disposed in mesh with the plurality of planet gears, the sun gear configured to rotatably drive the plurality of planet gears; and
        an elongated brake hub member axially extending from the sun gear so as to be disposed integrally with the sun gear, the brake hub member defining a set of internal splines and a set of external splines, the external splines extend partway along the length of the elongated brake hub member and located distally away from the integrally formed sun gear, wherein the set of internal splines are configured to mesh with a set of external splines from one of the axle shafts, and wherein the set of external splines are configured to mesh with a brake pack of the machine.

15. The machine of claim 14, wherein the ring gear, the plurality of planet gears, and the sun gear include one of: spur gear teeth, and helically-cut gear teeth.

16. The machine of claim 14, wherein the set of internal splines extend partway along a length of the elongated brake hub member.

17. The machine of claim 14, wherein the planetary gear carrier comprises:
  a first portion rotatably supported within the stationary side housing; and
  a second portion extending outwardly from the first portion, the second portion configured to releasably couple with a wheel rim of the machine.

18. The machine of claim 17, wherein the axle assembly further comprising at least one bearing member disposed between the stationary side housing and the first portion of the planetary gear carrier, wherein the bearing member is configured to allow rotation of the planetary gear carrier relative to the stationary side housing.

19. The machine of claim 14, wherein the brake pack includes at least one rotatable friction plate and at least one stationary reaction plate, the friction plates and the reaction plates co-located in an alternating manner about the external splines of the brake hub member.

20. The machine of claim 14 further comprising:
  an annular brake pad disposed about the brake hub member and located at one end of the brake pack, the brake pad rigidly coupled to the stationary side housing; and a brake piston disposed in the stationary side housing and located at another end of the brake pack, the brake piston operable for selectively applying a braking force by the brake pack on the brake hub member.

\* \* \* \* \*